INVENTORS,
ERNEST EVERET MINETT,
JOHN W. WEIGL
BY
ATTORNEYS

INVENTORS,
ERNEST EVERET MINETT,
JOHN W. WEIGL

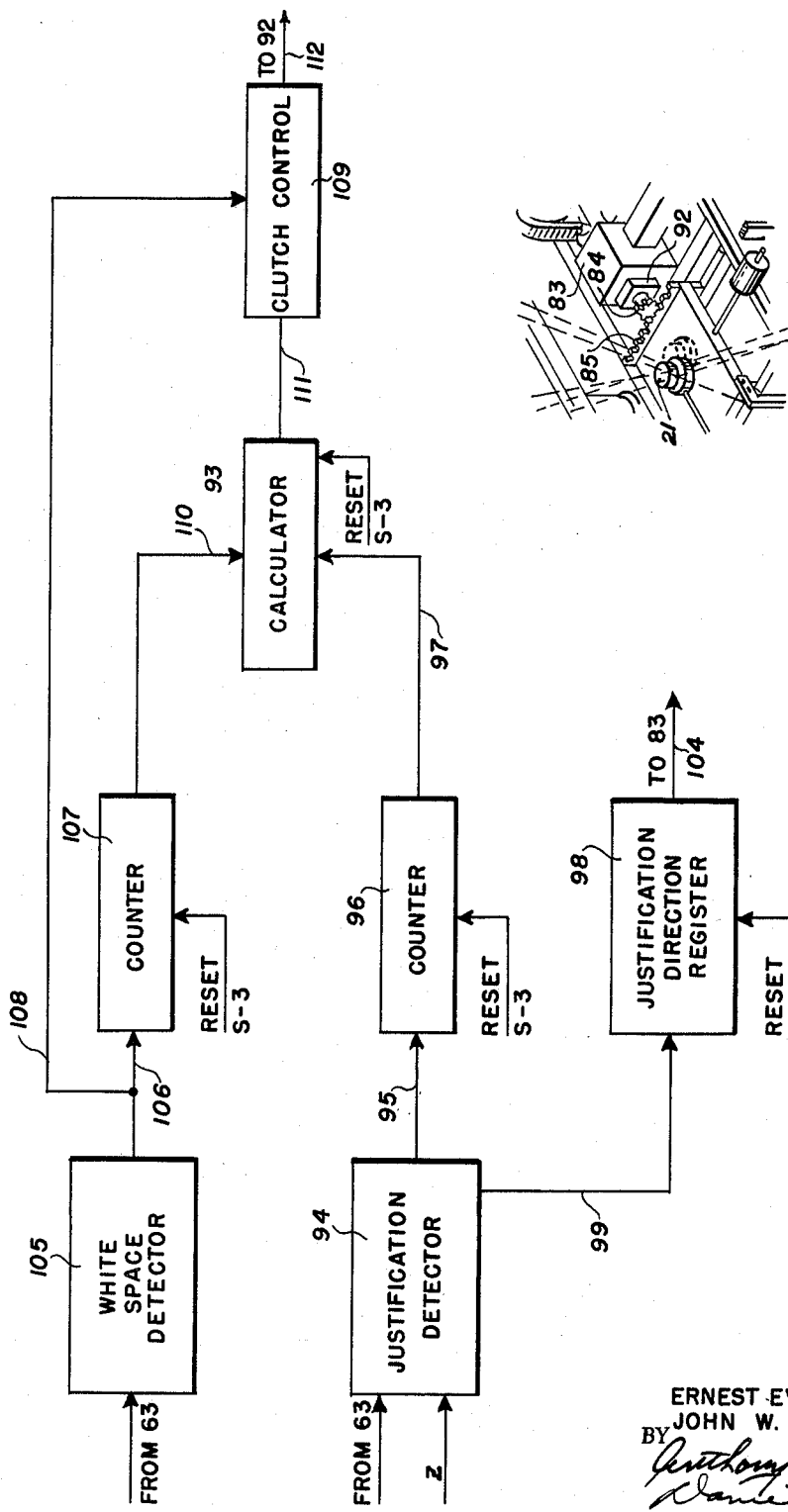

United States Patent Office 3,478,659
Patented Nov. 18, 1969

3,478,659
APPARATUS FOR JUSTIFYING A REPRODUCED LINE OF CHARACTERS
Ernest Everet Minett, Rochester, and John W. Weigl, West Webster, N.Y.; said Minett assignor to Xerox Corporation, Rochester, N.Y., a corporation of New York
Filed July 1, 1965, Ser. No. 468,698
Int. Cl. B41b 13/00, 15/00, 21/00
U.S. Cl. 95—4.5                        3 Claims

ABSTRACT OF THE DISCLOSURE

Apparatus for justifying a line of printed matter including a planar support for an original document to be justified positioned in an optical path relative to a planar support for a sensitized recording member such than an original document is scanned to project a justified image onto the recording medium. The justifying apparatus includes an asymmetric lens supported by a lens carriage positioned intermediate the original document support and the recording member support and movable at a synchronous speed related to a scanning mechanism to expand or contract the graphic data for justifying the image onto the recording medium. A second embodiment discloses apparatus for sensing the number of spaces between words in a line of information to intermittently move the lens carriage at a speed related to the scanning of the information such that the desired line justification is effected during the scanning of the interword spaces.

---

This invention relates to the graphic arts and particularly to method and apparatus for justifying a line of characters in the reproduction of previously unjustified original copy.

Many different methods of justifying lines of characters are known in the art and are incorporated in such devices as typewriters, linotype machines, and the like. It is usual in such devices to compress or expand a line of characters in the initial reproduction of an original document to dimensionally control character size in one direction in order to obtain line justification, or to obtain an analogous result by means of variation of intercharacter or interword spacing. Where justification is to be effected from original unjustified copy, it is usual in accordance with prior art techniques to employ an anamorphic lens or the like which optically distorts the original in the direction of line length in order to increase or decrease the length in accordance with the justification to be obtained.

Now in accordance with the instant invention, there is provided novel method and apparatus whereby a reproduction line-by-line justification of previously prepared unjustified copy can be effected with greater simplicity than heretofore and without employing an anamorphic lens. By means hereof, stretching or compression of each line of copy as conformed to a standard length is accomplished by purely mechanical operations of components through an asymmetric lens without causing magnification of the image characters in a vertical direction. These results are obtained while an original copy and sensitized recording member are supported optically separated and fixed throughout tthe operation requiring only the motion of lightweight mechanical parts and motion of small magnitude. Inherently fast operation is provided and features are afforded which are important in the economics and maintainability of a justifying device.

Accordingly, it is an object of the invention to provide novel method and apparatus for justifying a line of characters in the reproduction of previously prepared unjustified copy.

It is a further object of the invention to provide apparatus for justifying a line of characters in the reproduction thereof by principally mechanical means and without the necessity of an anamorphic lens.

It is a still further object of the invention to provide apparatus for line-by-line justifying of characters in the reproduction thereof in a manner able to control the stretching or compression of each the line length by principally mechanical means and without inherent vertical magnification of the image characters.

These and other objects are obtained by means of the apparatus of the invention in which a line of previously prepared unjustified copy is first photoelectrically scanned to ascertain the line length with regard to a reference standard to be maintained. The line is then oppositely scanned during a projection cycle that includes a conventional distortion-free type projection lens that is controllably moved from the determination of said sensing means and concomitantly with the image projection onto a sensitized reproduction surface.

The advantages of the present invention will become apparent upon consideration of the following detailed disclosure of an embodiment to be described in conjunction with the accompanying drawings in which:

FIG. 3 is a block electrical diagram for effecting an operative variation of the device of FIG. 1; and FIG. 4 is a fragmentary view of a portion of the device of FIG. 1 when adapted to be used in accordance with FIG. 3.

Figure 1:
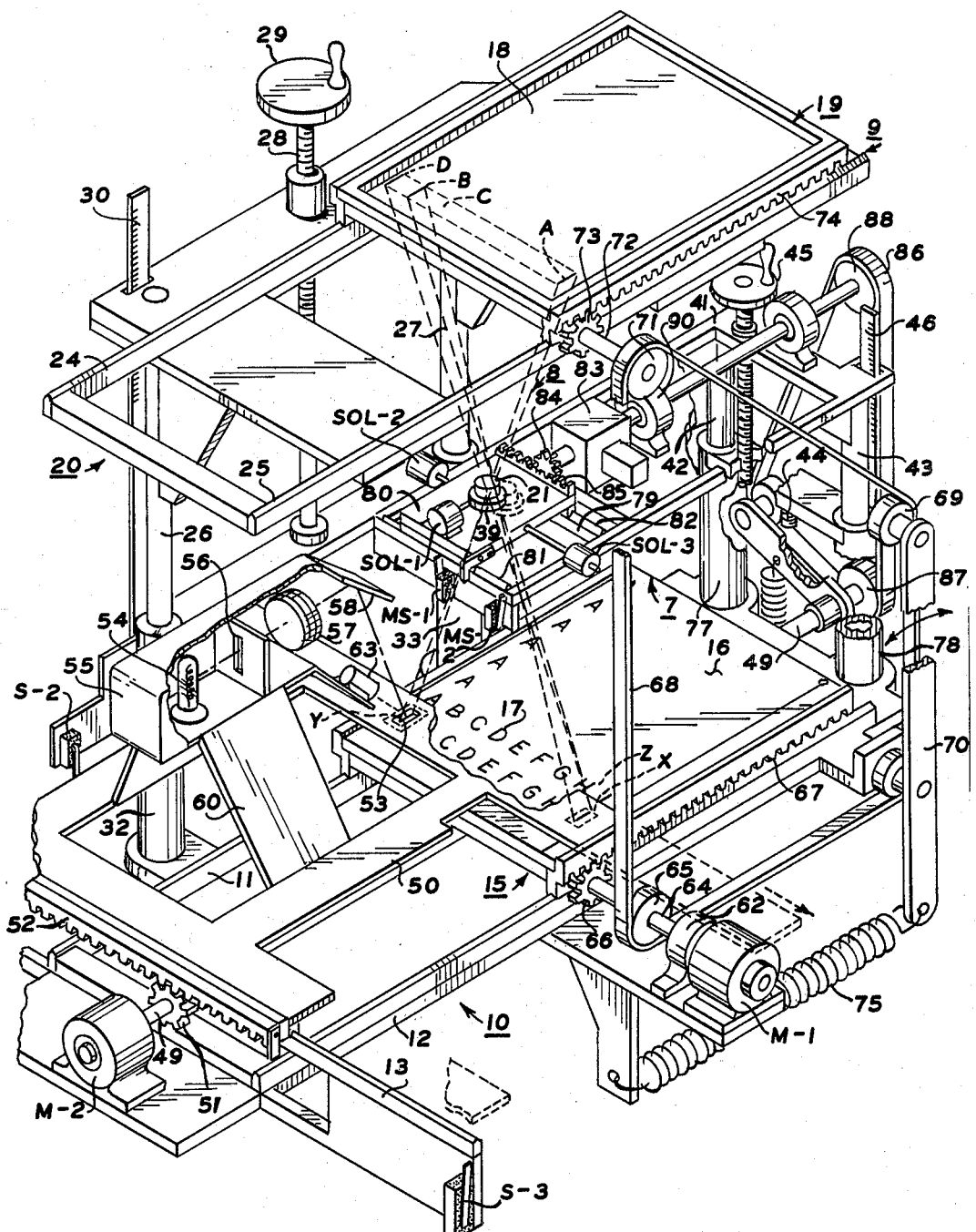
FIG. 1 is an isometric view of an apparatus embodying the principles of the invention.

Referring now to FIG. 1 the apparatus includes components arranged optically superpositioned and comprising a copy station 7, optical station 8, and recording station 9 respectively defining generally the object, focal and image planes.

The copy station includes the components for scanning and supporting original unjustified copy and is comprised of a support frame 10 having side rails 11 and 12 and front rail 13 each having bevel-formed top edges serving as guideways as will be described. Supported spanning the side rails for movement thereon is a rectangular copy holder carriage 15 including a recess in the top surface thereof to receive and retain a copy to be reproduced 16 having a plurality of linearally arranged image characters 17.

The carriage is adapted to be advanced incrementally on its side rails a distance corresponding to the line-to-line spacing of the image characters on copy sheet 16. When an advance is required, as will be understood it is effected by means of a continuously operative motor M-1 which when connected through a partial revolution magnetic clutch 62 engages drive shaft 64. Secured to the drive shaft on the output end of the clutch are timing pulley 65 and pinion 66, the former of which engages a timing belt 68 for moving the recording station elements in unison therewith while the latter engages rack 67 of the copyholder carriage.

Arranged to overlie a line of image characters and to effect a traverse scanning thereof is a T-shaped scanning bar 50 which completely conceals the image characters 17 except for a thin rectangular aperture 53 encompassing the vertical image height. As the scan bar is moved, the aperture traverses between a position represented by line "Y" corresponding arbitrarily to the left-hand image margin of copy sheet 16, and a position represented by a line "X" corresponding to about the right edge extremity of the copy sheet. As can be appreciated, a line of image characters 17 will be contained within the linear spacing extending between X and Y.

Reversible transverse movement of the scan bar over the top edge of rail 13 is effected by means of motor M-2 coupled to elongated shaft 49 on which is secured a pinion 51 meshing with rack 52 on the underside of the scan bar. The bar is adapted to be moved in the direction shown by the arrow from a position shown solid to that shown dashed. At opposite ends of travel are switches S-2 and S-3 which are activated as the bar arrives in each of the respective positions.

Illumination of the copy sheet below aperture 53 is provided from a lamp 54 in a housing 55 secured via support plate 60 to the scan bar in order to move therewith. Radiation from the lamp is caused to pass through a masked slit 56 to a condensing lens 57 from which it is focused onto a mirror surface 58 and then reflected rectangularly downward through aperture 53. Extending secured on the underside of the lamp housing in a reflecting relation to the copy surface below aperture 53, is a photoelectric detector 63 which is operative in ascertaining line length as will be described.

The optical station 8 includes a rectangular frame support 41 supported on vertical end-guide posts 42 and 43 extending up from sleeves 77 and 78 respectively, each in turn, secured to lower frame 10. At the forward end of the frame is an opening 79 over which there is mounted a controllably movable saddle 80 containing an asymmetric lens 21 in a mount above a shutter 39 operative under control of solenoid SOL-1. The saddle includes guideways adapted for riding on bevels 81 and 82 linearly in either direction as to move the lens from optical center determined as a function of whether image justification is to represent a compression or expansion relative to the original as will be understood. Movement of the saddle, when required, is at a controlled rate of speed correlated to the degree of justification to be effected and is produced from the output of a commercially available presettable speed and directional controller 83. Input to the controller 83 is derived via timing belt 86 being driven by pulley 87 on the extended end of motor shaft 49. The belt in turn drives pulley 88 on shaft 89 connecting to a magnetic clutch 90 connected when energized to the input side of the controller. The controller output is connected via pinion 84 engaging a rack 85 forming part of the rearward end of the saddle 80. By this means, lens movement is maintained completely synchronized with the movement of the scanning bar 50.

Following each projection cycle, lens 21 is returned to its optically centered position by means of piston solenoids SOL-2 and SOL-3 connected to opposite sides of the saddle and actuated at the appropriate point in the cycle by means of microswitches MS-1 and MS-2 respectively. The slightest movement of the saddle in either direction from optical center places the microswitches in their activated position.

The recording station 9 likewise includes a rectangular frame 20 including side rails 24 and 25 and mounted via vertical guide posts 26 and 27 extending up from sleeves 32 and 33 respectively secured to lower frame 10. Supported on the latter side rails is a holder 19 having a centrally open portion therein over which to receive and retain a sheet of light sensitive recording material 18 such as photographic film, xerographic plate or the like. Both copyholder 15 and film holder 19 are optically aligned substantially coextensive in parallel planes and adapted to be moved in unison codirectionally and equidistantly. With each incremental advance of copyholder 15 in preparation for projecting a justified image from a line of original unjustified characters 17, film holder 19 is simultaneously advanced equidistantly by means of timing belt 68 engaging timing pulley 71 secured to a common shaft 72 with pinion 73 meshing with film holder rack 74. Idler pulley 69 in lever 70 is under continuous tension by means of spring 75 to maintain timing belt 68 slackfree at all times.

Image reproduction generally is one-to-one but can comprise any magnification ratio desired. In order to optically adjust for any ratio, the plane of frame 20 is positionable by means of vertical lead screw 28 having a hand wheel 29 thereon which permits the frame to be raised or lowered as required. The desired position of the frame can be set in accordance with the indications contained on vertical calibration plate 30. Likewise, optical support frame 41 is positionally secured via vertical lead screw 44 having a hand wheel 45 whereby it too can be positioned in accordance with the calibrations contained on vertical calibration plate 46.

Figure 2:
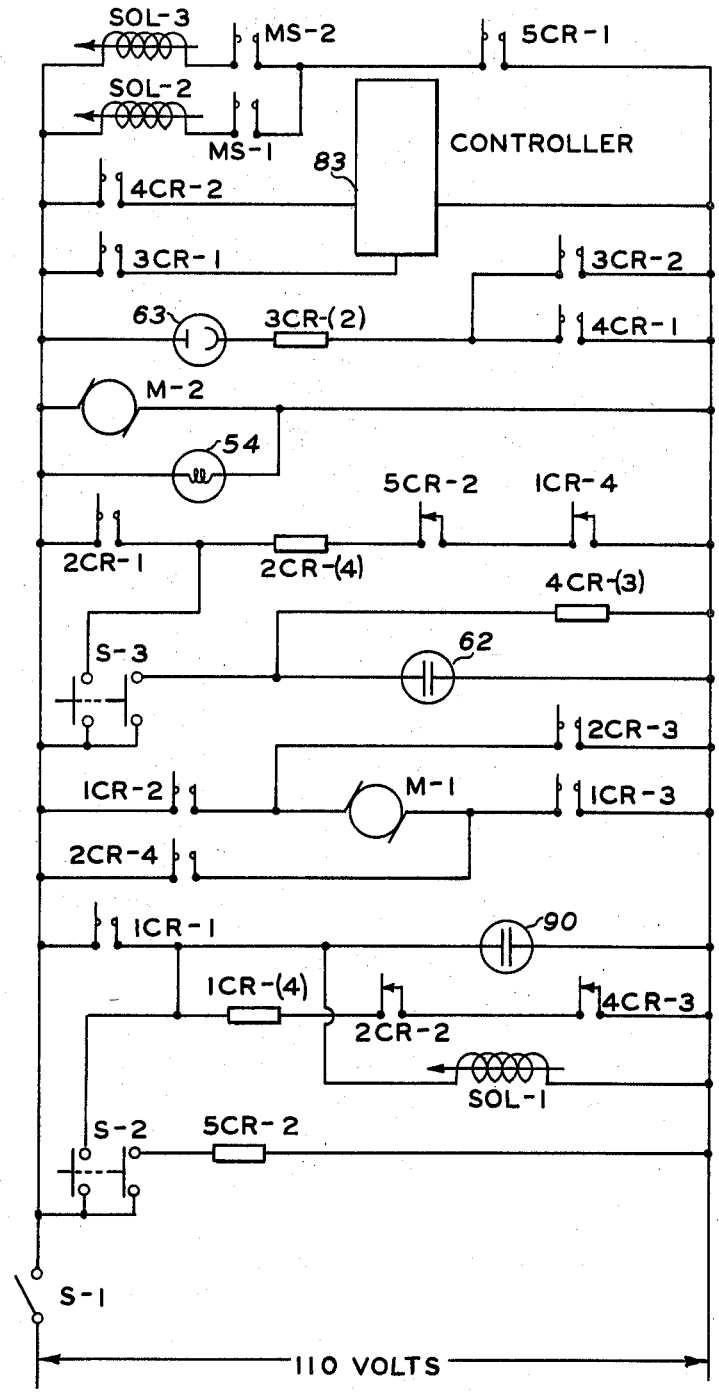
FIG. 2 is a schematic electrical diagram for operation of the device of FIG. 1.

Having described the operable components hereof, the operation of the apparatus in accordance with the objectives of the invention will now be described with reference also to FIG. 2. Operation is initiated with scanning bar 50 in the rightmost position (shown dotted) and slit aperture 53 overlying the hypothetical position "X" from which line length of the characters is determined relative to a margin line "Z" to be maintained. That is, character lines terminating at "Z" are to be unchanged while termination between "X" and "Z" are to be compressed and between "Y" and "Z" are to be expanded. It is the intention therefore, that margins "A" and "B" are to be maintained on film 18 such that images which would otherwise fall at "C" are to be expanded while those falling at "D" are to be compressed as to coincide with "B."

With the scanning bar in this position switch S-3 is actuated energizing relay 2-CR to energize motor M-1. As the scan bar traverses leftwardly, the illuminated copy below aperture 53 is immediately reflected into photosensor 63 emitting a signal sufficient to energize relay 3CR through the contacts of relay 4CR closing contact 3-CR1. For so long as it remains energized, the latter contact continues to preset the operating conditions for controller 83 incrementally from a maximum transport speed in an image compressing direction past a neutral inoperative position represented by margin position "Z" to a maximum transport speed in an expanding direction. On detecting the first character image 17 the reduced reflection intensity to the photocell reduces the emitted signal therefrom to deenergize relay 3-CR which then fixes the setting of the controller as it will be operative in the projection cycle. The scanning bar continues its leftward movement until striking switch S-2. This energizes relay 5-CR which through its contact permits MS-1 or MS-2 to restore lens 21 to an optically centered position while also energizing relay 1-CR which through its contacts energizes shutter solenoid SOL-1, clutch 90 and reverses the direction of scan motor M-2.

The projection cycle is then initiated with the shutter open and the line of image characters contained on copy sheet 16 are scanningly projected onto film 18. By means of the preset operating position of controller 83, the operating direction and movement thereof, if any, shifts the lens axis rightwardly for compression and leftwardly for expansion of the original image at a rate correlated to the degree of justification to be effected. Where justification for the particular line being reproduced is unnecessary, controller 83 remains set at its neutral inoperative position.

The scanning bar continues its movement to its rightmost position until again striking switch S-3. This again energizes relay 2-CR which is effective to energize clutch 62 whereby to advance the copy support the equivalent of one line below the scanning bar with the film holder moving an identical amount. At the same time, contact 4-CR2, connected to controller 83 resets the controller to the start position in preparation for a resetting in a subsequent length determination scan cycle. Suitable time delays are included to operation of the sequential functions. For lines not to be justified, such as the salutation on correspondence copy, clutch 90 remains inoperative.

In accordance with another monodimensional justification embodiment of the invention, line compression and expansion is effected primarily in the white spaces between words and lens 21 can remain generally at rest during the scan of the characters per se. In this embodiment, as the scan bar performs a prescan operation with a right to left motion, the signals from photocell 63 are used to count the total number of white spaces between words and the amount and direction of the required justification. After accumulating this information the system provides a program basis for lens 21 to subsequently be moved a predetermined distance when a space between words is detected during the scanning process as a function of the required justification and direction, in relation to the measured number of existing word spaces contained therein.

This perhaps can be better understood, by considering the total determined number of available white spaces as "W" and determined justification movement of the lens as "J." For the system being described "J"=½ the required justification. This then is programmed to a control system, as will be described, such that the lens 21 moves from an initial central location during the scanning projection of characters, and is caused to move a distance $J/W$ each time a white space between words is detected in the projection or scanning cycle. That is, a step motion of $J/W$ is provided via the controller to the lens, each time the photocell detects, during the projection cycle, an all white signal of greater than about 1.5 of a character width.

The operating mechanism for effecting this result, except for the necessary computing and programming is essentially similar to that described above and is illustrated in FIGS. 3 and 4. In FIG. 3 there is schematically shown an arrangement of components for effecting the computation for control of controller 83 and an additionally associated clutch 92 intermediately connected to pinion gear 84 shown also in FIG. 4.

The components for achieving this result include a calculator 93 such as a computer or the like to which information is provided for determining the duration, and thus the magnitude of the lens steps, of the pulses fed to the clutch at appropriate times in the projection scan cycle. Input for the calculator is provided from different sources that includes a justification detector 94 receiving input from photocell 63 and margin indicator at "2" to provide a pulse train via lead 95 that is totaled by counter 96 which in turn transmits its count in the form of a binary coded signal to the calculator 93 via lead 97. Counter 96 is initially reset by actuation of microswitch S-3. Justification direction register 98 stores the information, determined during the prescan, to itself determine the direction of motion of lens 21. The justification direction register 98 receives its information via lead 99 from the justification detector 94 and is reset by microswitch S-3. Upon completion of the prescan, counter 96 transmits its binary coded signal corresponding to the magnitude of the required justification via lead 97 to calculator 93. The justification direction register establishes via lead 104 the direction of rotation of 83, which 83 always rotates at a fixed r.p.m. but in a direction determined by the signal on lead 104. For this embodiment therefore, the variable speed feature of controller 83 is unnecessary.

Also receiving an amplified signal from photocell 63 is a white space detector 105 which is adapted to produce an output pulse each time a space between words greater than 1.5 character is encountered. The detector emits an output signal via lead 106 to a counter 107 which totals the pulses during prescan while lead 108 therefrom emits the same signal to clutch control 109. Counter 107 likewise is reset by a signal on switch S-3. The total number of usable white spaces (W) is transmitted from counter 107 to the calculator in the form of a binary coded signal via lead 110. When this signal is transmitted to the calculator, the calculator determines the ratio of $J/W$.

The calculator 93 therefore effects the calculation to determine the movement for justification as is to be associated with each detected white space between words in the projection scan and emits its output in the form of a binary scoded signal to clutch control unit 109 via lead 111. Calculator 95 is also reset by a signal on S-3. During the projection scanning operation, clutch control unit 109 produces pulses whose duration is proportional to $J/W$ each time a white space is detected by the white space detector. These pulses are sent via lead 112 for controlling operation of clutch 92.

In operation, the information needed by the system is gathered by the various components during the prescan operation, as the scanning carriage moves from right to lift and the electronic system observes and detects whether the right hand character border or printing is encountered first. Detecting the border first indicates a line to be expanded while a printing detection indicates a line to be compressed. Thereafter, as the carriage is reversed for the scan cycle, movement of the lens 21 is controlled by the clutch control signals.

By the above description, there is disclosed novel apparatus for effecting monodimensional justification of previously unjustified copy reproduced onto a recording member. The apparatus is simple to construct and operate and functions principally with mechanical motions and without the use of an anamorphic lens as has been customary in the prior art. Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. Apparatus to effect optically projected image justification of a line of previously unjustified image characters comprising in combination:
    (a) an objective asymmetric lens mounted for linear movement in a plane optically related between an original copy sheet having a line of unjustified image characters to be reproduced and a sensitized recording member on which the characters of said original copy are to be projected;
    (b) image scan means overlying the image character area of said copy sheet and having an aperture defined therein for exposing restricted portions of the copy sheet to said lens;
    (c) drive means operatively connected to said scan means to effect linear and reversible movement thereof over the linear area of said copy sheet containing the image characters to be projected whereby said scan means moves in a first direction in a prescan cycle for ascertaining the degree of justification to be effected and then in the opposite direction for exposing the image characters in a projection cycle through said lens to the recording member;
    (d) lens transport means connected to said lens mount and operable in said projection cycle to move said lens mount in said plane linearly in accordance with the kind and degree of justification to be effected;
    (e) sensing means operative when said scan means moves in said prescan cycle to emit first signals corresponding to both the determined line length of the image character relative to a predetermined standard and the measured distance of areas contained in said line devoid of a printed character and operative when said scan means moves in said projection cycle to emit second signals as the aperture in said scan means passes said devoid areas;
    (f) means to receive the first signals from said sensing means for determining in response thereto the degree and kind of justification to be effected; and
    (g) means to receive the second signals from said sensing means to selectively actuate said lens transport means in response thereto in accordance with the determination of said last recited means.

2. Apparatus according to claim 1 including calculating means comprising the means to receive the first and second signals of said sensing means.

3. Apparatus to effect optically projected image justification of a line of previously unjustified image characters comprising an objective lens positioned between an original document support for supporting an original copy sheet having a line of unjustified image characters to be reproduced and a sensitized recording member support for supporting a sensitized recording member on which the characters of the original copy are to be projected, said lens being supported for linear movement in a plane between said supports, image scan means overlying the image character area of an original copy sheet supported on said original copy sheet support and having an aperture therein for exposing restricted portions of the copy sheet to said lens, drive means operatively connected to said scan means to effect linear and reversible movement thereof over the linear area of a copy sheet containing the image characters to be projected and supported on said copy sheet support such that said scan means moves in a first direction in a prescan cycle for ascertaining the degree of justification to be effected and then in the opposite direction for exposing the image characters in a projection cycle through said lens to a recording member, lens transport means carrying said lens and operable during said projection cycle to move said lens linearly in accordance with the kind and degree of justification to be effected, sensing means operative during said prescan cycle to emit first signals corresponding to both the determined line length of the image characters relative to a predetermined standard and the measured areas in the line devoid of a printed character.

said sensing means operative during said projection cycle to emit second signals as the aperture in said scan means passes the devoid areas, means to receive the first signals from said sensing means for determining in response thereto the degree and kind of justification to be effected, and means to receive the second signals from said sensing means to selectively actuate said lens transport means in reponse thereto in accordance with the determination of said last recited means to effect justification during movement of said scan means over the areas devoid of a printed character.

References Cited

UNITED STATES PATENTS 2,261,538  11/1941  Brand.

JOHN M. HORAN, Primary Examiner